July 26, 1960

R. M. BRIDGES ET AL 2,946,980

SOUND RANGING SYSTEM

Filed May 2, 1955

INVENTORS
E. W. RUDY
J. A. RUMMELL
R. M. BRIDGES

BY *Woodbury*

ATTORNEY

July 26, 1960

R. M. BRIDGES ET AL 2,946,980

SOUND RANGING SYSTEM

Filed May 2, 1955

INVENTORS
E. W. RUDY
J. A. RUMMELL
R. M. BRIDGES

BY *Woodbury*

ATTORNEY

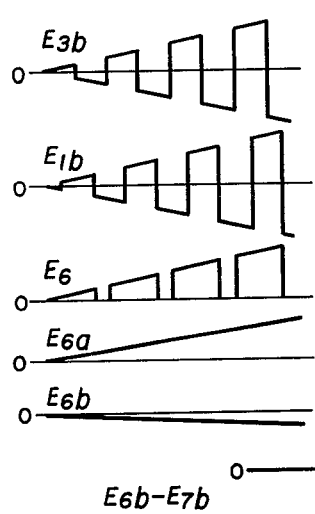
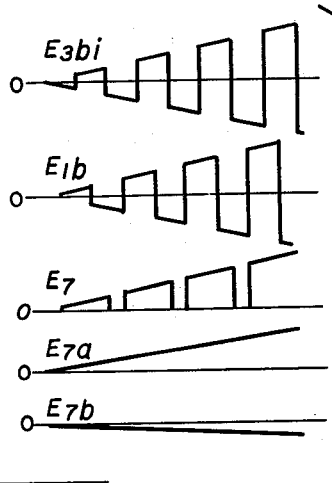
Fig. 7
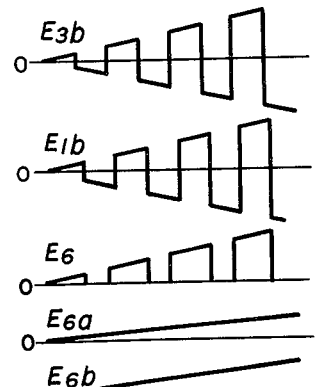
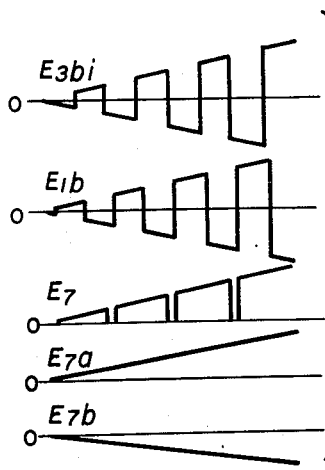
Fig. 9

United States Patent Office 2,946,980
Patented July 26, 1960

2,946,980

SOUND RANGING SYSTEM

Robert M. Bridges, North Hollywood, Erland W. Rudy, Reseda, and James A. Rummell, Glendale, Calif., assignors to Bendix Aviation Corporation, North Hollywood, Calif., a corporation of Delaware Filed May 2, 1955, Ser. No. 505,142

10 Claims. (Cl. 340—6)

This invention relates to sonic echo ranging systems for determining the direction and distance of underwater targets.

An object of the invention is to provide such a system that is reliable and sufficiently accurate for many purposes while being relatively simple and inexpensive as compared to most such systems.

A feature of the invention is the combination of: a directional transducer adapted to be pointed in any one of a plurality of discrete directions; a cathode ray tube or oscilloscope; and electrical means varied according to the position of the transducer for correlating the direction of sweep of the oscilloscope beam with the direction of the transducer.

Another feature is the foregoing combination with the addition of purely electrical means for further shifting the direction of sweep of the oscilloscope beam according to the angle of impingement of a sound pulse on the transducer whereby the direction of a target can be more accurately displayed.

Another feature is a simple and effective transducer and phase comparator circuit for producing oscilloscope-deflecting currents correlated with the angle of impingement of sonic waves on the transducer.

Other more specific objects and features of the invention will become apparent from the following description with reference to the drawing, in which:

Figs. 6 and 6A are vector diagrams showing the phase relations of certain potentials in the system resulting from signals received on the center line of the transducer.

Fig. 7 is a series of graphs showing the nature of other potentials in the system resulting from signals received on the center line of the transducer.

Figs. 8 and 8A are vector diagrams showing the phase relations of certain potentials in the system resulting from the reception of signals off the center line of the transducer.

Fig. 9 is a series of graphs showing the nature of other potentials in the system resulting from signals received off the center line of the transducer.

THE GENERAL SYSTEM

Figure 1:
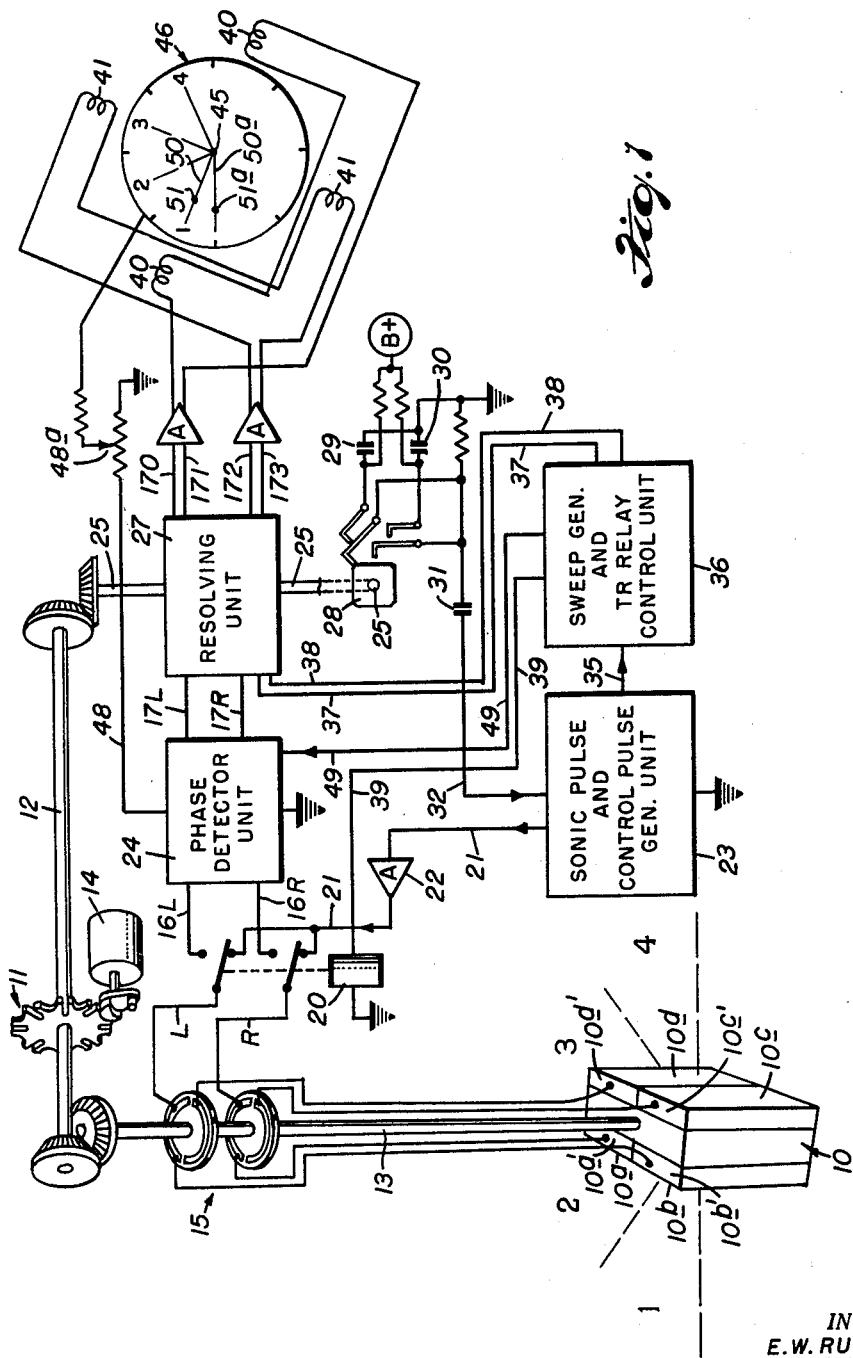
Fig. 1 is a schematic diagram of a complete underwater ranging system in accordance with the invention.

Referring to Fig. 1, the system comprises in its preferred form a transducer 10 adapted to be intermittently turned, through angles of 45°, between eight discrete positions by a Geneva mechanism 11 through shafts 12 and 13. The Geneva mechanism may be actuated by a continuously running motor 14. The transducer 10 has two oppositely directed planar working faces, each consisting of two independent half faces associated with separate electrically independent transducer sections. Thus one face is constituted by two half faces 10a and 10b, respectively, associated with transducer sections 10a' and 10b', constituting one transducer element, and the other face is constituted by two half faces 10c and 10d, respectively, associated with transducer sections 10c' and 10d', constituting a second transducer element.

Only one face of the transducer is active at any one time, and a commutator 15 is provided to connect the transducer section 10a' to one transducer lead R and the other transducer section 10b' to another transducer lead L during movement through half of a revolution, and connect the transducer section 10c' to the transducer lead R and the transducer section 10d' to the transducer lead L during the second half revolution. During the second half revolution, the half faces 10c and 10d are successively directed in the same directions 1, 2, 3 and 4 that the half sections 10a and 10b were directed during the first half revolution, so the net effect is that during each rotation of the transducer two scanning cycles through the positions 1, 2, 3 and 4 are completed.

The transducer leads R and L are adapted to be connected, by a relay 20, either to a line 21 to which a pulse of alternating current of sonic frequency is applied through an amplifier 22 from a sonic pulse and control pulse generating unit 23, or to the input leads 16R and 16L, respectively, of a phase detector unit 24.

The shaft 12 is coupled to a shaft 25 which actuates switches in a resolving unit 27 and also actuates a cycling switch 28 which initiates a sequence of operations whenever the transducer moves into a new position. Thus, every eighth of a revolution the switch 28 connects one or the other of two charged condensers 29 and 30 through a condenser 31 to a conductor 32 to deliver a positive pulse to the sonic pulse and control pulse generating unit 23.

This pulse triggers an oscillator in unit 23 to deliver the aforementioned pulse of alternating current over conductor 21 to the transducer sections 10a' and 10b' (or the transducer sections 10c' and 10d', as the case may be) and transmit a sonic pulse from the active half faces.

This pulse travels outward in the water, and if it encounters an object, an echo is returned to the transducer. In the meantime, the following operations take place:

At the end of the A.C. pulse generated in the unit 23, a positive control pulse is applied over a lead 35 to a sweep generator and transmitting relay control unit 36 to: (1) initiate a linearly rising D.C. sweep potential which is applied over leads 37 and 38 to the resolving unit 27, and (2) to simultaneously interrupt a current previously applied over a conductor 39 to the relay 20, thereby transferring connection of the transducer leads R and L from the lead 21 to the leads 16R and 16L, so that a received sonic echo signal will be applied to the phase detector unit 24.

The resolving unit 27 applies the sweep potential received over the leads 37 and 38 to one or both of the two sets of deflection coils 40 and 41, respectively, of an oscilloscope 46 in such a way as to cause the trace of the oscilloscope to sweep radially from a normal or neutral position 45 along one of four radii 1, 2, 3, 4 corresponding to the four transducer positions 1, 2, 3, 4. If the transducer is in position 1, the sweep potential is applied by the apparatus 27 only to coils 41, causing the beam to sweep from the neutral position toward position 1. If the transducer is in position 2, the sweep potential is applied to both the coils 40 and coils 41 in such relation as to cause the beam to sweep in direction 2, If the transducer is in position 3, the resolving apparatus applies the sweep potential only to the sweep coils 40 to cause the beam to sweep in direction 3. If the transducer is in position 4, the resolving apparatus applies the sweep potential to both the coils 40 and 41 in such relation as to cause the beam to sweep in direction 4.

At the end of the sweep cycle, the sweep generator and transmitting relay control unit 36 energizes the conductor 39 to actuate the transmit-receive relay 20 into transmit position, placing the system in condition for the transmission of another sonic pulse when the switch 28 is again actuated by movement of the transducer into a new position.

If no echo is received during a sweep period, the oscilloscope beam sweeps along that one of the four radii corresponding to the transducer position and remains of uniform intensity.

If an echo is received at the transducer, approximately equal potentials are generated in the active transducer sections, and applied over the conductors R and L, and 16R and 16L to the phase detector 24. If the direction from which the echo returns is perpendicular to the transducer face, i.e., on center, the potentials on the conductors 16R and 16L will be in phase, and equal and small D.C. potentials will be applied by the phase detector 24 over conductors 17R and 17L to the resolving apparatus and will not affect the differential currents applied to the deflection coils 40 and 41, so that the oscilloscope spot 45 will sweep along the radius 1. However, the A.C. voltage pulse resulting from the received echo is amplified in the phase detector 24 and applied over a conductor 48 and through an adjusting potentiometer 48a to the cathode of the oscilloscope 46 to brighten the spot at a point 51 located a distance from the point 45 corresponding to the travel time of the sonic pulse from the transducer to the target and back, thereby indicating the direction and distance of the target.

If the target is not on a line perpendicular to the transducer face, the echo will not reach the two halves of the transducer at the same time, and there will be a phase difference in the potentials applied to the phase detector unit 24 over conductors 16R and 16L corresponding in direction and magnitude to the angle of approach of the sonic echo to the transducer.

The phase detector 24 responds to potentials of different phase to apply to conductors 17R and 17L, respectively, D.C. potentials of different magnitude which are applied by the resolving apparatus 27 to the deflection coils 40 and/or 41 in such a way as to change the direction of sweep of the oscilloscope beam (for the duration of the pulse) in accordance with the angle of impingement of the echo on the transducer.

If the transducer is in position 1, as shown, in which the sweep potential from the unit 36 is applied only to the deflection coils 41, the deflection voltage derived from the output of the phase detector over conductors 17R and 17L is applied by the resolving unit 27 only to the deflection coils 40. If the transducer is in position 2 or 4, in which the sweep potential is applied to both sets of deflection coils 40 and 41, the output of the phase detector 24 is superimposed on the sweep currents in such a way as to reduce the current in one set of sweep coils and increase it in the other set.

If an off-center echo signal existed throughout the sweep cycle and the output delivered by the phase detector 24 remained constant during the sweep cycle, it would cause the oscilloscope beam to sweep parallel to the radial path 50 it would follow if the target were on center, instead of along a desired new radial path, such as the radial path 50a, for example. To obtain the desired radial sweep, the output of the phase detector to conductors 17R and 17L must progressively increase with the sweep potential. This result is obtained by modulating the potentials delivered to conductors 17R and 17L with a rising potential from the sweep generator unit 36, which is delivered over a conductor 49 to the phase detector unit 24.

Actually, of course, since the echo pulse is of very short duration, the oscilloscope spot does not move along the radial path 50a throughout its sweep. Instead, it moves along the radial path 50 until the echo pulse is received, then jumps in direction normal to the path 50 to the path 50a, moves along the latter for the duration of the pulse, and then jumps back to the path 50. The brightened spot is indicated at 51a.

A complete understanding of the system will become apparent from the following detailed descriptions of the component units 23, 36, 24 and 27, which are shown only as blocks in the main circuit of Fig. 1.

*Sonic pulse and control pulse generating unit*

Figure 2:
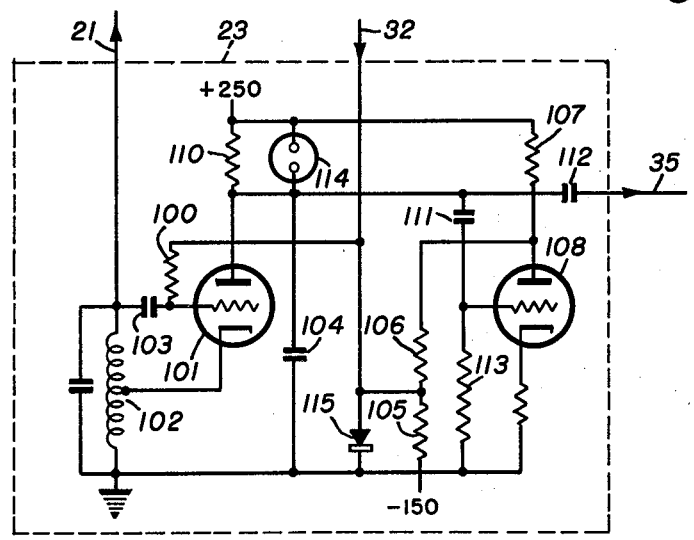
Fig. 2 is a schematic diagram of a sonic pulse and control pulse generating circuit used in the system.

Referring to Fig. 2, the sonic pulse and control pulse generating unit 23 comprises a Hartley oscillator consisting of a triode 101 having its cathode connected to a tap on a tuned circuit 102, its grid connected through a blocking condenser 103 to the high potential end of the tuned circuit and its anode connected through a blocking condenser 104 to the grounded end of the tuned circuit. Normally, the grid of tube 101 has a negative bias sufficient to prevent oscillation, this negative bias being derived from a potential dividing circuit consisting of resistors 105, 106 and 107 connected in series between negative and positive D.C. potential sources. The junction of resistors 106 and 107 is connected to ground through the anode-cathode circuit of a triode 108, the grid of which is normally only slightly negative with respect to the cathode, so that the tube is conductive. The current drawn by tube 108 produces a large potential drop in the resistor 107 so that the grid of tube 101 is biased beyond cut-off.

As previously described, each time transducer 10 (Fig. 1) reaches a new position of dwell, the cam-actuated switch 28 applies a positive pulse over the conductor 32 to the unit 23. This positive pulse raises the potential at the junction of resistors 105 and 106 from its former negative value to slightly above ground potential, as determined by the forward conduction characteristics of a rectifier 115. This renders tube 101 conductive, and it starts oscillating and drawing current through a resistor 110 from the positive D.C. source, thereby producing a drop in the average D.C. positive potential at the anode of tube 101, which is applied as a negative pulse through a condenser 111 to the grid of tube 108. This negative pulse drives the tube 108 far beyond cut-off, reducing the potential drop in resistor 107 and thereby raising the potential at the junction of resistors 105 and 106 and maintaining the grid of tube 101 near ground potential to thereby maintain the oscillations in that tube that were initiated by the positive pulse over the conductor 32. These oscillations continue until the tube 108 again becomes conductive, as determined by the time required for the negative pulse applied to the grid of that tube through condenser 111 to leak off through the grid resistor 113. Conduction of tube 108 restores the normal high negative bias on the grid of tube 101, stopping it from oscillating, which restores the anode of that tube to its normal high positive potential and applies a positive pulse through a condenser 112 to the conductor 35 leading to the sweep generator unit 36 (Fig. 1).

A constant-voltage glow tube 114 is connected in parallel with the resistor 110, so that when tube 101 is oscillating and drawing current the glow tube maintains a substantially constant voltage on the anode to improve the frequency stability of the oscillations.

Summarizing the unit 23 responds to a positive starting pulse on conductor 32 to apply to the amplifier 22 (Fig. 1) a sonic pulse of fixed duration consisting of a train of high frequency waves, and to apply to the conductor 35 a positive control pulse at the end of the sonic pulse. It also applies to conductor 35 a negative pulse at the start of the sonic pulse, but this negative pulse is not utilized and produces no effect.

Sweep generator and TR relay control unit

Figure 3:
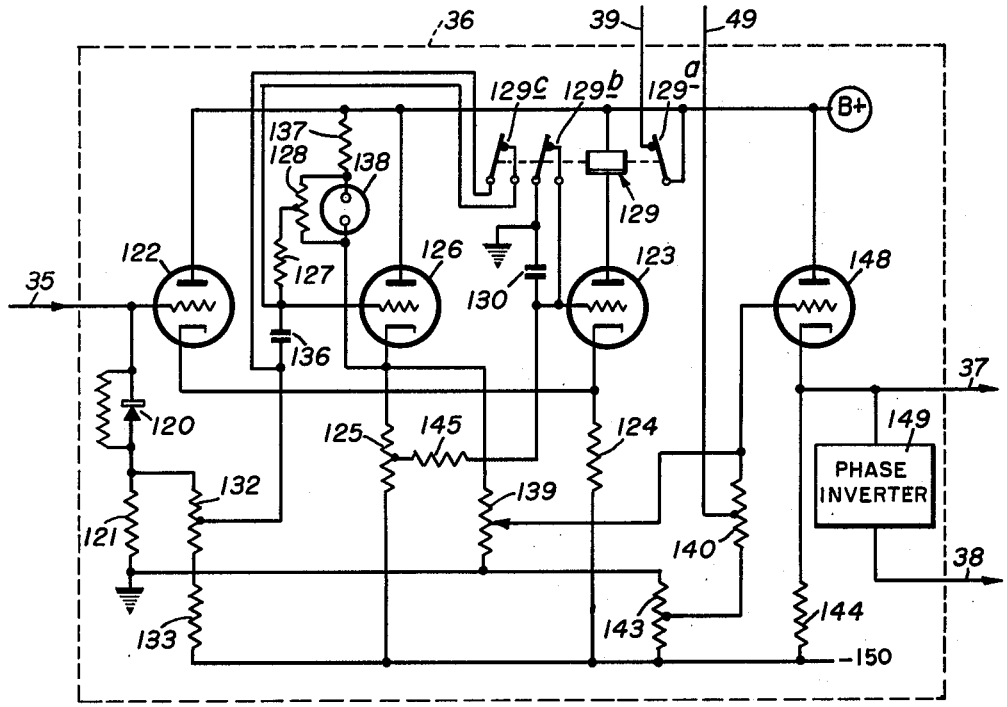
Fig. 3 is a schematic diagram of a sweep generator and transmitting relay control circuit used in the system of Fig. 1.

Referring now to Fig. 3, showing the circuit of the unit 36, the conductor 35 from unit 23 (Fig. 2) is connected to the grid of a tube 122 and to ground through a rectifier 120 and a resistor 121. Tube 122 is normally cut off prior to application of a positive pulse to conductor 35, because its cathode is connected to the cathode of a tube 123 and through a common resistor 124 to the negative D.C. supply, and tube 123 is conducting current to produce a potential drop in resistor 124 sufficient to maintain the cathodes of tubes 122 and 123 at a substantial positive potential above ground. Tube 123 is conductive because its grid is connected to ground over the front contacts 129b of a relay 129. However, tube 122 is cut off because the upper end of the resistor 121 is connected through a resistor 132 and a resistor 133 to the negative D.C. potential supply, thereby maintaining the grid of tube 122 appreciably negative with respect to its cathode.

The relay 129 is in the anode circuit of tube 123 and is energized by the current flow through the tube, and front contacts 129a of this tube connect the positive D.C. supply line to the conductor 39 to hold the relay 20 (Fig. 1) in transmit position.

When the unit 23 operates as previously described, it applies to conductor 35 a negative pulse at the start of transmission of a sonic pulse and a positive pulse at the end thereof. The negative pulse is shunted to ground through the rectifier 120 and does not affect the tube 122 (which is cut off, anyway), but the positive pulse makes the tube strongly conductive, driving the cathodes of both tubes 122 and 123 sufficiently positive to cut off tube 123 and release relay 129.

Tube 122 remains conductive after it has been triggered by the positive pulse over conductor 35, because tube 123, being cut off, reduces the potential across the cathode resistor 124, thereby rendering the cathode of tube 122 only slightly positive relative to its grid.

The release of relay 129 causes the following operations:

(1) Relay contacts 129a open the line 39 to release the relay 20 (Fig. 1) into receive position.

(2) Contacts 129b open to remove ground from the grid of tube 123, permitting the grid to assume a negative potential as determined by a voltage-dividing circuit consisting of a tapped resistor 125 connected between the cathode of tube 126 and the negative supply, holding tube 123 cut off.

(3) Contacts 129c open and remove a short circuit from a sweep condenser 136 connected between the grid of tube 126 and a fixed potential tap on resistor 132. This permits current to flow into sweep condenser 136 through a charging resistor 127 of relatively high resistance, from the positive D.C. source.

If the charging current is maintained constant, the potential applied to the grid of tube 126 will rise linearly with time, which is desired. To maintain the charging current substantially constant, the charging resistor 127 is connected to a tap on a resistor 128, one end of which is connected through a resistor 137 to the positive supply line, and the other end of which is connected to the cathode of tube 126. A constant voltage glow discharge tube 138 is shunted across resistor 128.

The cathode of the cathode follower 126 substantially follows the grid potential as the latter rises, and the resultant rising cathode potential is applied to the lower end of resistor 128. Since the glow tube 138 maintains constant potential across resistor 128, the potential of the upper end of resistor 128 rises at the same rate. Hence, the potential at the upper end of the charging resistor 127 rises at the same rate as the lower end, and the potential thereacross and the current therein remain approximately constant.

Condenser 136 continues to charge, causing the potential of the cathode of tube 126 to rise until the potential applied from the tap on resistor 125 through resistor 145 to the grid of tube 123 becomes high enough to render that tube conductive. This cuts off tube 122 and pulls relay 129, restoring the circuit to the starting position.

The linearly rising potential at the cathode of tube 126 is applied through a voltage-dividing resistor 139 to the grid of a cathode follower 148. This same potential is connected through a resistor 140 to a tap on a voltage-dividing resistor 143 connected between the negative D.C. source and ground.

A tap on resistor 140 applies a rising potential synchronized with the sweep potential over the conductor 49 to the phase detector 24 (Fig. 1) to cause the output of the phase detector to progressively increase with the sweep potential as previously described. Its fixed D.C. component is fixed by the position of the tap on resistor 143.

The cathode of the cathode follower 148 is connected directly to the conductor 37 and through a phase inverter 149 to the conductor 38. The result is that a rising sweep potential of positive polarity is applied to conductor 37, and an equal, rising negative sweep potential is applied to the conductor 38.

Phase detector

Referring to Fig. 1, pulses received by the transducer half face 10a or 10c are applied over conductor R and one back contact of relay 20 to conductor 16R, and pulses received by the transducer half face 10b or 10d are applied over conductor L and the other back contact of relay 20 to conductor 16L.

Figure 4:
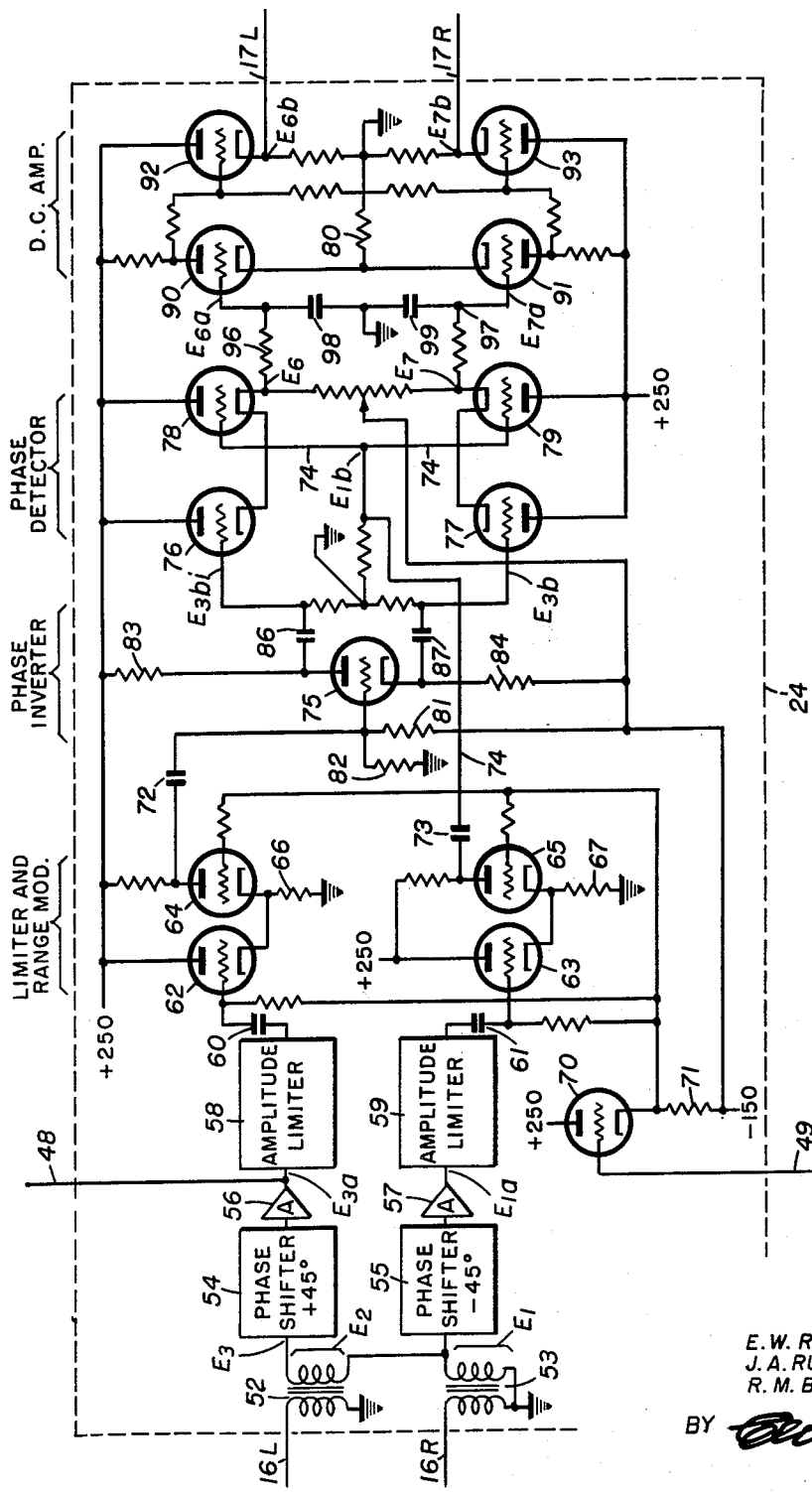
Fig. 4 is a schematic diagram of a phase-detecting circuit that may be employed in the system.

Referring to Fig. 4, the pulses received over conductor 16L are applied to the primary winding of a transformer 52, and the pulses received over conductor 16R are applied to the primary winding of a transformer 53. The alternating potential induced in the secondary winding of transformer 52 is identified as $E_2$, and the alternating potential induced in the secondary winding of transformer 53 is identified as $E_1$. The upper end of the secondary winding of transformer 53 is connected to a phase shifter 55, and is also connected through the secondary winding of transformer 52 to a phase shifter 54. It will be observed, therefore, that a potential $E_1$ of phase determined by the phase of the potential on the conductor 16L is applied to the phase shifter 55, but that potential $E_3$ applied to phase shifter 54 is the sum of potentials $E_1$ and $E_2$, and when $E_1$ and $E_2$ differ in phase, $E_3$ will have a phase intermediate the two.

Phase shifter 54 shifts the phase of potential $E_3$ +45° and applies it through an amplifier 56 as potential $E_{3a}$ to an amplitude limiter 58, and also to the conductor 48, which as previously explained energizes the cathode of the oscilloscope 46 (Fig. 1) to brighten the trace at the time of reception of an echo. It is desirable to derive the brightening pulse from the sum potential $E_{3a}$ rather than from the potential $E_{1a}$ derived from only one-half of the transducer, because the sum potential gives the effect of a single large transducer having a narrower and longer sensitivity lobe than does either half 10a or 10b alone.

The phase shifter 55 shifts the potential $E_1$ −45° and applies it through an amplifier 57 as potential $E_{1a}$ to an amplitude limiter 59 which is identical with amplitude limiter 58.

The potentials $E_{3a}$ and $E_{1a}$ applied to the amplitude limiters vary with variations in the strength of the echo signals received on the transducer, but the amplitude limiters 58 and 59 clip the signal waves applied thereto to convert them into square waves of substantially fixed amplitude, irrespective of the strength of the potentials $E_{3a}$ and $E_{1a}$ applied thereto. Therefore, the outputs of these amplitude limiters are square waves of constant amplitude, but differ in phase when the input potentials $E_{3a}$ and $E_{1a}$ are of different phase.

The output of the amplitude limiter 58 is applied through a coupling condenser 60 to the grid of a tube 62, and the output of amplitude limiter 59 is applied through a coupling condenser 61 to the grid of a tube 63. The cathode of the tube 62 is coupled to the cathode of an associated grounded grid amplifier tube 64 by a coupling resistor 66 connected to ground. The cathode of tube 63 is likewise coupled to the cathode of grounded grid amplifier tube 65 by a coupling resistor 67 connected to ground. The grids of all four tubes 62, 63, 64 and 65 are connected through suitable isolating resistors to the cathode of a cathode follower 70 which is connected through a coupling resistor 71 to a source of negative potential. The grid of the cathode follower 70 is connected to the conductor 49 which, as previously explained, extends from the sweep generator and has a sweep potential of appropriate value applied thereto. This sweep potential is therefore applied through the cathode follower 70 to the grids of the tubes 62, 63, 64 and 65 to progressively increase the output at anodes of tubes 64 and 65 during the sweep cycle.

Each pair of tubes 62, 64 and 63, 65, respectively, functions as a variable limiter the output potential (at the anode of tube 64 or 65) of which varies with the sweep potential applied over conductor 49 from the sweep generator 36. The value of this potential is so adjusted (by resistors 140 and 143 in Fig. 3) that tubes 62—65 are normally at cut-off when the sweep voltage is at the origin point corresponding to zero range. As the sweep voltage rises, tubes 62 and 63 conduct during positive signal excursions, but cut off during negative excursions of the signals. However, when tubes 62 and 63 are conducting (in response to positive signal excursions) their cathodes swing positive, carrying the cathodes of tubes 64 and 65 positive with respect to their grids and cutting off those tubes. Therefore, tubes 62 and 63 limit on negative signal excursions, and tubes 64 and 65 limit on positive signal excursions. The limiting level rises with the sweep potential applied to the grids of the tubes, so that the signal output potentials at the anodes of tubes 64 and 65, if echo signals were received during the entire sweep cycle, would be a series of square waves of amplitude rising with the range sweep potential, as shown in the upper curves of Figs. 7 and 9.

The output of the tube 65 is applied from the anode thereof through a coupling condenser 73 over a conductor 74 to the grids of a pair of cathode followers 78 and 79. The output of the tube 64 is applied from the anode of that tube through a coupling condenser 72 to the grid of a phase-inverting triode 75, the grid D.C. potential of which is maintained at a suitable negative value by connecting it to the junction points of a pair of series resistors 81 and 82 connected between the negative D.C. source and ground. The anode of tube 75 is connected through a coupling resistor 83 to the source of positive D.C. potential, and the cathode is connected through a coupling resistor 84 to the negative source of D.C. The anode of tube 75 is coupled through a coupling condenser 86 to the grid of a tube 76, and the cathode of tube 75 is coupled through a coupling condenser 87 to the grid of a tube 77. The over-all result of the connections described is that a potential $E_{1b}$ of phase corresponding to that of potential $E_{1a}$ is applied to the grids of tubes 78 and 79; a potential $E_{3b}$ of phase corresponding to potential $E_{3a}$ is applied to the grid of tube 77; and a potential $E_{3b1}$ of opposite (inverted) phase to potential $E_{3a}$ is applied to the grid of tube 76. The output potentials $E_6$ and $E_7$ at the cathodes of tubes 78 and 79, respectively, are applied through low pass filters, consisting of resistors 96 and 97 and condensers 98 and 99, to the grids of a pair of D.C. amplifying tubes 90 and 91, respectively, the anodes of which are connected to the grids of a pair of cathode followers 92 and 93, respectively, the cathodes of which are connected to the conductors 17R and 17L (Fig. 1), which connect the phase detector 24 to the resolving apparatus 27. The cathodes of tubes 90 and 91 are connected together and through a common resistor 80 to ground.

The operation of the phase detector 24 will now be explained with reference to the diagrams of Figs. 6, 6a, 7, 8, 8a and 9. Considering first the situation when a receiving signal is on the center line of the transducer 10, both the input potentials $E_1$ and $E_2$ and the sum potential $E_3$ are in phase with each other, as indicated by the vectors $E_1$, $E_2$, $E_3$ in Fig. 6. After the potentials $E_1$ and $E_3$ have been shifted in phase by the phase shifters 54 and 55, respectively, the resultant potentials $E_{3a}$ and $E_{1a}$ differ from each other in phase by 90°, as shown in Fig. 6a. After the potentials $E_{3a}$ and $E_{1a}$ have passed through the amplitude limiters 58 and 59 and the sweep modulating tubes 62, 64, 63 and 65, they have been converted into square waves of progressively rising potentials, as indicated by the curves $E_{3b}$ and $E_{1b}$, as shown in Fig. 7. It will be noted that these potentials and the potential $E_{3b1}$ rise gradually from zero initial value to a maximum (at the end of the sweep cycle).

In Fig. 7, the wave lengths are greatly exaggerated to show the shape. Actually, many thousands of cycles occur during each sweep period. It is also to be remembered that Fig. 7 shows the nature of the changes that would occur in the various potentials during the entire sweep cycle if a continuous echo signal were received. Actually, only a short pulse is received, but the graphs show that the amplitude of the various potentials would be for a pulse occurring at any point in the sweep cycle.

As is well known, the cathode potential of a cathode follower follows the grid potential very closely. Therefore, when the grid of either one of the tubes 76 and 78 has a positive potential applied thereto, the potentials of both cathodes follow the greater grid potential, and the lesser grid potential has no effect. The same is true of the tubes 77 and 79. The result is that as long as the grid of either tube 76 or 78 is positive, the potential $E_6$ of the cathode has a corresponding value, and it remains substantially the same whether the grid of the other tube has the same or a lesser potential. The same is true for tubes 77 and 79. Therefore, in Fig. 7, the curves $E_{3b}$ and $E_{1b}$, when added together, produce the resultant curve $E_6$ which, if the rising sweep potential is ignored, remains at one constant value while either curve $E_{3b}$ or $E_{1b}$ is at its peak, and drops to a minimum value only when both potentials $E_{3b}$ and $E_{1b}$ are at their minimum values. Since potential $E_{1b}$ lags $E_{3b}$ 90°, there is a 90° overlap of the waves, and potential $E_6$ is at its maximum value for 270° of each cycle, and at zero value for the remaining 90°. Since potential $E_{3b1}$ is displaced 180° from $E_{3b}$, it is 90° retarded with respect to potential $E_{1b}$, and when added to potential $E_{3b1}$ produces the potential $E_7$ which has an average value identical with that of potential $E_6$.

After filtering by the resistors 96 and 97 and the condensers 98 and 99, the potentials $E_6$ and $E_7$ become the smoothly rising equal potentials $E_{6a}$ and $E_{7a}$ (Fig. 7) which, after passing through the amplifier tubes 90 and 91 and the cathode followers 92 and 93, become the potentials $E_{6b}$ and $E_{7b}$, respectively. It will be noted that potentials $E_{6b}$ and $E_{7b}$ have a much lesser slope than potentials $E_{6a}$ and $E_{7a}$ (and are inverted due to the phase inversion between grid and anode). The lesser slope is desirable, because it reduces the current swings in the sweep circuits of the oscillograph in the same direction, and it results from the common cathode resistor 80 associated with the tubes 90 and 91 in the following manner:

When potentials $E_{6a}$ and $E_{7a}$ applied to the grids of tubes 90 and 91 are equal, the cathodes of both these tubes follow the potentials of the grids to the extent of the potential drop in the common resistor 80, thereby reducing the potential difference between the grids and cathodes and equally reducing the amplifying effects of both tubes. Now let it be assumed that equal, opposite polarity signals are applied to the grids of tubes 90 and 91. This tends to raise the potential (in positive direction) of the one cathode while reducing that of the other, thereby making no net change in the common cathode potential, so that the entire grid potential change is effective in changing the anode output voltages of tubes 90 and 91. Therefore, the full amplifying effect of both tubes is effective for unbalanced input signals.

Irrespective of the absolute values of potentials $E_{6b}$ and $E_{7b}$ (Fig. 7), since they are identical, their difference $E_{6b} - E_{7b}$ is zero, so that there is no potential difference applied to the deflection circuit of the oscilloscope, and the beam of the tube sweeps along the center of the sector which is being scanned at that instant, thereby indicating that the transducer is pointed directly at the source of sound. With the transducer in position 1, as shown in Fig. 1, the beam trace is along the radial path 50, and the bright spot showing the distance and direction is indicated at 51.

Now assume that the object from which the sound is reflected is off-center to the left with respect to the transducer 10 so that it strikes the transducer half 10b in advance of the transducer half 10a. This causes the potentials $E_1$ and $E_2$ (Fig. 8) to differ in phase to an extent determined by the speed of sound in water and by the spacing between the centers of the two transducer half faces 10a and 10b, which are constants, and by the angle of approach, which is the variable to be measured. With a relatively large transducer, deviation of the sound direction from the center line of only a few degrees will produce an electrical phase difference between the potentials $E_1$ and $E_2$ of relatively large magnitude. In the present instance, it is assumed (as shown in Fig. 8) that the potential $E_2$ lags the potential $E_1$ 90°, under which condition the phase of the sum potential $E_3$ is intermediate that of potentials $E_1$ and $E_2$ and 45° displaced from each. After passage through the phase shifters 54 and 55 (Fig. 4), respectively, the potential $E_1$ is retarded 45°, and the sum potential $E_3$ is advanced 45°, as indicated by the vectors $E_{1a}$ and $E_{3a}$ of Fig. 8a.

Referring now to Fig. 9, it will be observed that the potential $E_{1b}$ lags the potential $E_{3b}$ 45°, whereas potential $E_{1b}$ leads the potential $E_{3bi}$ 135°. The result is that potential $E_6$ has longer gaps than in Fig. 7, whereas the potential $E_7$ has shorter gaps. The mean or average value of potential $E_6$ is relatively small, whereas the mean or average value of potential $E_7$ is higher. After potentials $E_6$ and $E_7$ have been filtered, they appear as the voltages $E_{6a}$ and $E_{7a}$, the latter having a steeper slope than the former.

For the reasons previously explained, differences in the potentials $E_{6a}$ and $E_{7a}$, respectively, are accentuated in the D.C. amplifier consisting of the tubes 90 and 91, so that potentials $E_{6b}$ and $E_{7b}$ may slope in opposite directions, as shown in Fig. 9. Under these conditions, the difference between potentials $E_{6b}$ and $E_{7b}$ is no longer zero, but is represented by relatively steeply sloping line "$E_{6b} - E_{7b}$" in Fig. 9. This produces a potential difference in the deflection circuit of the oscilloscope which causes the beam to move along a straight line (as long as echo is being received) to the left of the center line of the sector, producing a bright trace 51a lying in the radial path 50a, as shown in Fig. 1, thereby indicating that the source of sound (the target) is to the left of center by an angle corresponding to the angle between the radial path 50 and the radial path 50a, the brightened portion 51a of the trace indicating the approximate distance and direction of the target.

Obviously, if the source of sound is on the other (right) side of the transducer center line, it will impinge on transducer half face 10a in advance of transducer half face 10b, the phase relations between the potentials $E_1$ and $E_2$ will be reversed, and the trace produced on the oscilloscope during receipt of the echo signal will be on the right of the center line instead of on the left.

It is to be understood that the system can be used to produce some indication of an off-center signal without converting the sinusoidal waves $E_{1a}$ and $E_{3a}$ to square waves, as has been described. However, the provision of the amplitude limiters 58 and 59 has the advantages of eliminating the effect of changes in amplitude of the received signals, as well as providing square waves. The great advantage of the square waves is that they cause the difference between potentials $E_{6b}$ and $E_{7b}$ to vary linearly with the phase departure between $E_1$ and $E_3$, so that no special calibration of the oscilloscope is required to cause the beam to indicate not only the direction of deviation of the sound source from the center position, but the magnitude of the deviation.

As previously indicated, the amount of phase shift between the potentials generated in the respective half faces of the transducer is a function of the size of the transducer and frequency as well as of the angle of approach of the echo. When the successive positions of the transducer are 45° apart as shown, it need respond to echoes within only a 45° sector or 22½° off center on each side. Hence, the transducer may be dimensioned to produce the maximum desired phase difference of about 90° between potentials $E_1$ and $E_2$ (Fig. 8a) in response to an echo 22½° off center.

*The resolving unit*

As previously indicated in the general description of Fig. 1, the function of the resolving unit 27 is to apply the sweep potentials received over conductors 37 and 38 and the D.C. output of the phase detector 24 received over conductors 17R and 17L to the oscilloscope deflection coils in such manner as to correlate the direction of sweep of the beam with the direction in which the transducer is pointed.

Figure 5:
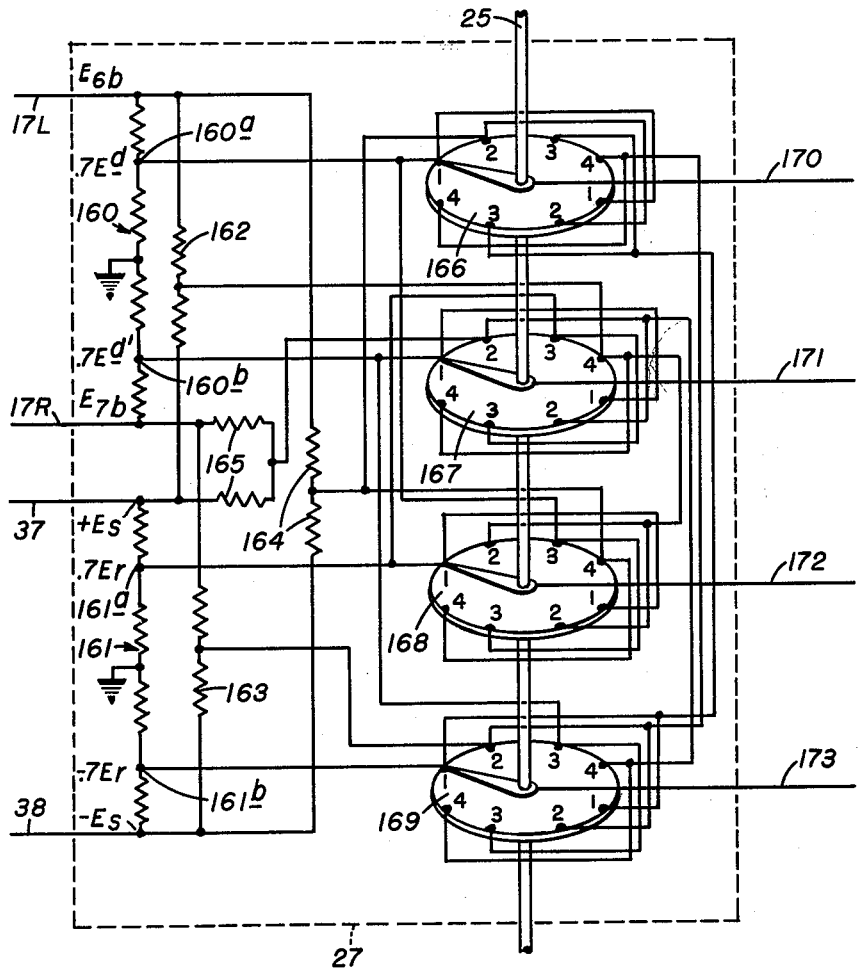
Fig. 5 is a schematic diagram of a resolving apparatus that may be employed in the system.

Referring to Fig. 5, the resolving unit comprises a plurality of resistance networks associated with the phase detector output lines 17R and 17L and the sweep generator output lines 37 and 38, and a switch mechanism operated by the shaft 25 and connecting different points on the resistance networks to the oscilloscope deflection coils in different positions of the shaft 25.

The resistance networks include:

(1) A voltage divider 160 connected between the phase detector output conductors 17R and 17L;

(2) A voltage divider 161 connected between the sweep generator output conductors 37 and 38;

(3) A voltage divider 162 connected between conductors 17L and 37.

(4) A voltage divider 163 connected between conductors 17R and 38;

(5) A voltage divider 164 connecting conductors 17L and 38;

(6) A voltage divider 165 connecting conductors 17R and 37.

The switch assembly comprises four rotary switches 166, 167, 168 and 169, each having a movable contact connected to a different one of the four conductors 170, 171, 172, 173 (Fig. 1) feeding the deflection coils of the oscilloscope, and having fixed contacts connected to taps on the voltage dividers 160—165.

*Position 1.*—It will be observed that in position 1 of the switch (corresponding to position 1 of the transducer), it connects conductor 170 to a tap 160a and conductor 171 to a tap 160b on voltage divider 160, thereby applying to the deflection coils 41 a potential proportional to, but less than, the potential difference between the phase detector output conductors 17R and 17L. The switch simultaneously connects conductor 172 to a tap 161a and conductor 173 to a tap 161b on the voltage divider 161, thereby applying to the deflection coils 40 a potential proportional to, but less than, the potential difference between the sweep voltage conductors 37 and 38. Hence, the oscilloscope beam sweeps along radius 1 if the received echo is on center (under which condition there is no potential difference between conductors 17R and 17L), and jumps to one side of the radius 1 during reception of an echo if the received echo is off center (under which condition there is a potential difference between conductors 17R and 17L).

The potentials of the conductors 37 and 38 are always equal and of opposite polarity, so that the potential difference between the conductors is always twice the potential of either conductor alone. The voltage dividers 160 and 161 are so proportioned that the potential at tap 160a, is .7 the potential $E_{6b}$ of conductor 17L; the potential of tap 160b is .7 the potential $E_{7b}$ of conductor 17R; the potential at tap 161a is .7 the potential $+E_s$ of conductor 37; and the potential at tap 161b is .7 of the potential $-E_s$ of conductor 38.

Therefore, in position 1 the potential applied to the deflection coils 40 over conductors 170 and 171 is $.7(E_{6b}-E_{7b})$ and is a function only of the output of the phase detector; and the potential applied to the deflection coils 41 over conductors 172 and 173 is $.7E_s-(-.7E_s)$ or $1.4E_s$, and is a function only of the output of the sweep generator.

*Position 2.*—In position 2 of the switch, it connects conductor 170 to the center tap on voltage divider 164, conductor 171 to the center tap on voltage divider 165, conductor 172 to the center tape on voltage divider 162, and conductor 173 to the center tap on voltage divider 163.

This applies to conductor 170 half the potential difference between conductors 17L and 38, or $$\frac{E_{6b}+E_s}{2}$$

the potential applied to conductor 171 is $$\frac{E_{7b}-E_s}{2}$$

and the deflection voltage applied between conductors 170 and 171 is $$\frac{E_{7b}-E_{6b}}{2}+E_s$$

Likewise, the potential applied between the conductors 172 and 173 is $$\frac{E_{6b}-E_{7b}}{2}+E_s$$

It will be noted that if the received signal is on center in position 2 of the transducer, the potential difference between the lines 17R and 17L is zero, and that only the potential $E_s$ is applied to both sets of deflection coils, thereby causing both sets to exert an equal effect on the electron beam. The resultant force (magnetic) is along the radius 2 and has a magnitude of $1.4E_s$, so that the rate of sweep is the same as it was in Fig. 1. If the target is off center, the other components $E_{6b}$ and $E_{7b}$ will have different values and be of opposite polarities as applied to the two deflection systems, so that the result will be to deflect the beam to one side or the other of radius 2 (during reception of the echo signal), corresponding to the direction in which the received echo signal is off center with respect to the transducer.

*Position 3.*—In position 3, the conductor 170 is connected to the tap 161b, and the conductor 171 is connected to the tap 161a, whereas the conductor 172 is connected to the tap 160a, and the conductor 173 is connected to the tap 160b. Therefore, the signal potential is applied only to the deflection coils 41, and the sweep potential is applied only to the deflection coils 40, which is just the reverse of the condition that prevails in position 1. Hence, the beam normally sweeps along radius 3 in response to sweep potential on coils 40, but may be deflected to either side by off-center signals applied to coils 41.

*Position 4.*—In position 4, the conductor 170 is connected to the mid tape on voltage divider 163, the conductor 171 is connected to the mid tap on voltage divider 162, the conductor 172 is connected to the mid tap on voltage divider 164, and the conductor 173 is connected to the mid tap of voltage divider 165. Hence, the potentials that were applied to the deflection coils 41 in position 2 to urge the beam along radius 1 are now applied to coils 40 to urge the beam along radius 3, and the potentials that were applied to coils 40 in position 2 to urge the beam along radius 3 are now applied to coils 41 to urge the beam in direction opposite to radius 1. The result is that the beam sweeps along radius 4.

*Summary*

In its complete form as described, the invention responds to an echo of a sound pulse transmitted from the transducer to indicate with considerable accuracy the distance and the direction of the object producing the echo.

However, the system will also indicate the direction of an original source of sound, and when used for this purpose only a portion of the apparatus shown is necessary. Thus, in a broad aspect, the invention resides in a system having the following elements: the rotatable directional transducer 10 and the apparatus including the motor 14, Geneva mechanism 11, and shafts 12 and 13 for successively rotating it in steps between fixed discrete directional positions and dwelling it in each position for selective reception of wave energy approaching from a plurality of discrete directions; the cathode ray oscilloscope having the beam deflection means 40, 41 energizable in a plurality of different modes for deflecting the beam in any one of a plurality of discrete directions 1, 2, 3, 4 corresponding to the discrete directional positions 1, 2, 3, 4 of the transducer; the source of potential 36 and the resolving means 27 including the switch mechanism (Fig. 5) having a plurality of discrete positions corresponding to the discrete directions of the oscilloscope for selectively deriving deflecting potentials from the source 36 and applying them to the beam deflection means 40, 41 in the different modes; the apparatus including the shafts 12 and 25 for actuating the switch mechanism in phase with the transducer rotation; and the beam control means including the transducer 10, the detecting unit 24, the conductor 48, the potentiometer 48a, and the cathode of the oscilloscope for varying the intensity of the beam in response to received wave energy.

In its simplest aspect, as described, only one of the four transducer sections 10a', 10b', 10c' and 10d', respectively would be used, and the appearance of the beam along any one of the directions 1, 2, 3, 4 on the oscilloscope would mean simply that the source of sound is in that general direction.

A feature of the invention which facilitates the scanning of a sector not greater than a semicircle is the transducer consisting of a plurality of independent directive transducer elements (such as the element made up of the two sections 10a', 10b', and the element made up of the two sections 10c' and 10d') pointed in different directions symmetrically angularly spaced about a common axis by a displacement angle inversely proportional to the number of the transducer elements, with the switch means consisting of the commutators 15 for selectively connecting successive transducer elements to the beam control means in response to successive rotations of the transducer through the displacement angle between the elements, so that the different elements are successively conditioned to scan through the same sector.

For distance determination of an object or target, the system is supplemented by the addition of the sonic pulse generating unit 23 for electrically energizing the transducer to cause it to emit wave energy, and the transmit-receive switch relay 20 for selectively connecting the transducer either in transmit or receive position, and the control switch actuated by the cam 28 in phase with the movements of the transducer into each position of dwell for moving the transmit-receive switch into and retaining it in its transmitting position for a fixed interval and then moving it into its receiving position.

A further refinement is the use of the sonic pulse generator of unit 23 which is adapted to oscillate for a fixed interval of time when triggered and to trigger the sweep generator in the unit 36 in response to cessation of oscillation of the pulse oscillator.

A further refinement is the division of the transducer into two coplanar, laterally displaced wave reception members producing separate output potentials varying in phase with the angle of incidence of wave energy thereon which are converted by the phase detector unit 24 into an auxiliary beam-deflecting potential and applied by the resolving unit 27 to the beam-deflection means 40, 41 to give a more accurate indication of the direction of approach of the wave energy.

In a simple form, the discrete positions of the transducer would be angularly spaced 90° apart corresponding to the X and Y axes of the oscilloscope (directions 1 and 3), and the resolving unit would always apply a potential proportional to the potential from the sweep generator 36 to one only of the deflection means 40 or 41, and a potential proportional to the auxiliary potential from the phase detector 24 to only the other deflection means 41 or 40.

When the discrete positions of the transducer are angularly spaced only 45° apart, the resolving means (unit 27) must include the additional potential dividers 162, 163, 164 and 165 and the associated switches for deriving and applying to one of the X and Y deflection systems a third deflection potential proportional to the sum of the source (sweep) potential and the auxiliary potentials, and for deriving and applying to the other of the X and Y deflection systems a fourth deflection potential proportional to the difference between the source and auxiliary potentials.

Although for the purpose of explaining the invention a particular embodiment thereof has been shown and described, obvious modifications will occur to a person skilled in the art, and we do not desire to be limited to the exact details shown and described.

We claim:

1. Apparatus for determining the direction of a source of wave energy comprising: a directional transducer responsive to wave energy impinging thereon for producing an electrical output potential; means for successively rotating said transducer in steps between a plurality of predetermined discrete directional positions and dwelling it in each position, for selective reception of wave energy approaching from a plurality of discrete directions; a cathode ray oscilloscope having a beam-deflection means energizable in a plurality of different discrete modes for deflecting the beam in any one of a plurality of discrete directions corresponding to said discrete directional positions of said transducer; a source of potential; resolving means including a switch mechanism having a plurality of discrete positions corresponding to said discrete directions for selectively deriving deflecting potentials from said source and applying them to said beam-deflection means in said different modes; means for actuating said switch mechanism in phase with said transducer rotation; beam-control means responsive to said transducer output potential for varying the intensity of said beam in response to received wave energy; said transducer comprising a plurality of independent directive transducer elements pointed in different directions symmetrically angularly spaced about a common axis by a displacement angle inversely proportional to the number of elements, said angle of displacement being a multiple of the angle of each of said discrete steps of rotation of said transducer; switch means coupled to said transducer-rotating means for selectively connecting successive transducer elements to said beam-control means in response to successive rotations of said transducer through said displacement angle whereby successive transducer elements are successively effective to receive wave energy from the same discrete directions.

2. Apparatus for determining the direction of a source of wave energy comprising: a directional transducer responsive to wave energy impinging thereon for producing an electrical output potential; means for successively rotating said transducer in steps between a plurality of predetermined discrete directional positions and dwelling it in each position, for selective reception of wave energy approaching from a plurality of discrete directions; a cathode ray oscilloscope having a beam-deflection means energizable in a plurality of different discrete modes for deflecting the beam in any one of a plurality of discrete directions corresponding to said discrete directional positions of said transducer; a source of potential; resolving means including switch mechanism having a plurality of discrete positions corresponding to said discrete directions for selectively deriving deflecting potentials from said source and applying them to said beam-deflection means in said different modes; means for actuating said switch mechanism in phase with said transducer rotation; beam control means responsive to said transducer output potential for varying the intensity of said beam in response to received wave energy; means for electrically energizing said transducer to emit wave energy; switching means movable between a transmitting position connecting said transducer to said energizing means and a receiving position connecting said transducer to said beam-control means; and switch control means responsive to movement of said transducer-rotating means into each position of dwell for moving said switch means into and retaining it in its transmitting position for a fixed interval, and then moving it into its receiving position.

3. Apparatus according to claim 2 in which said energizing means comprises a pulse oscillator adapted to be triggered to oscillate for said fixed interval.

4. Apparatus according to claim 3 in which said resolving means includes a sweep generator adapted to be triggered to generate a uniformly rising sweep potential for application by said switch mechanism to said beam-deflection means; and means for triggering said sweep generator in response to cessation of oscillation of said pulse oscillator.

5. Apparatus for determining the direction of a source of wave energy comprising: a directional transducer responsive to wave energy impinging thereon for producing an electrical output potential; means for successively rotating said transducer in steps between a plurality of predetermined discrete directional positions and dwelling it in each position, for selective reception of wave energy approaching from a plurality of discrete directions; a cathode ray oscilloscope having a beam-deflection means energizable in a plurality of different discrete modes for deflecting the beam in any one of a plurality of discrete directions corresponding to said discrete directional positions of said transducer; a source of potential; resolving means including a switch mechanism having a plurality of discrete positions corresponding to said discrete directions for selectively deriving deflecting potentials from said source and applying them to said beam-deflection means in said different modes; means for actuating said switch mechanism in phase with said transducer rotation; and beam control means responsive to said transducer output potential for varying the intensity of said beam in response to received wave energy; in which said transducer comprises two coplanar laterally-displaced wave energy receptive members producing two separate output potentials of relative phase variable with the angle of incidence of said wave energy thereon; phase-comparing means responsive to said output potentials for producing an auxiliary beam-deflecting potential of magnitude and sign corresponding to the magnitude and sign of phase difference between said output potentials; said resolving means including means for applying said auxiliary potential to said beam deflection means to deflect the oscilloscope beam from its said discrete direction in proportion to said angle of incidence of wave energy on said transducer.

6. Apparatus according to claim 5 in which: said oscilloscope beam-deflection means comprises separate X and Y deflection systems having X and Y axes 90° apart and aligned with discrete directions of said oscilloscope; said resolving means comprises a plurality of potential-dividing means connected to said potential source and to the output of said phase-comparing means for deriving a first deflection potential proportional to said source potential; and a second deflection potential proportional to said auxiliary potential; said switch mechanism comprising switch elements operable in said different discrete positions of said transducer to apply said first deflection potential to said X deflection system and said second deflection potential to said Y deflection system in one discrete position, and to apply said first deflection potential to said Y deflection system and said second deflection potential to said X deflection system in a second discrete position spaced 90° from said first discrete position.

7. Apparatus according to claim 6 in which said transducer-rotating means has an additional set of discrete positions of dwell midway between said mentioned positions; said resolving means includes potential-dividing means for deriving a third deflection potential proportional to the sum of said source and auxiliary potentials and a fourth deflection potential proportional to the difference between said source and auxiliary potentials; said switch mechanism comprising switch elements operative to apply said third and fourth deflection potentials to said X and Y deflection systems, respectively, in one of said additional positions, and to said Y and X deflection systems, respectively, in the next adjacent additional position.

8. Apparatus according to claim 5 in which said phase-comparing means comprises: a pair of cathode follower assemblies, each assembly comprising two cathode followers having their cathodes directly connected together; a pair of output terminals; means coupling the cathodes of one assembly to one of said output terminals and the cathodes of the other assembly to the other output terminal; means for deriving from said two transducer output potentials a sum potential of phase corresponding to the mean phase of said two transducer output potentials; first input means for phase shifting said reference potential 45° in one direction and applying it directly to one grid of one cathode follower assembly and in phase opposition to one grid of the other assembly; and second input means for phase shifting one of said transducer output potentials 45° in the other direction and applying it in the same phase to the other grid of each assembly.

9. Apparatus according to claim 8 in which said transducer output potentials are substantially sinusoidal and said input means include amplitude-limiting means for converting said sinusoidal potentials to square wave potentials of equal amplitude.

10. Apparatus according to claim 8 in which said means coupling the cathodes of said cathode follower assemblies to said output terminals includes an amplifier comprising: two tubes, each having a cathode, grid and anodes; the cathodes of the two tubes being connected together; a source of space current for said tubes; a common impedance element connecting said source to both said cathodes for imparting to both cathodes a positive bias potential proportional to the sum of the space currents of both tubes; means coupling the cathodes of one of said cathode follower assemblies to the grid of one of said tubes, and the cathodes of the other of said assemblies to the grid of said other tube; and means coupling the anodes of said two tubes to said respective output terminals.

References Cited in the file of this patent

UNITED STATES PATENTS

| | | |
|---|---|---|
| 2,426,217 | Hoisington | Aug. 26, 1947 |
| 2,473,974 | Schuck | June 21, 1949 |
| 2,524,180 | Schuck | Oct. 3, 1950 |
| 2,702,379 | Barton | Feb. 15, 1955 |
| 2,703,396 | Rich | Mar. 1, 1955 |